United States Patent Office 3,148,938
Patented Sept. 15, 1964

3,148,938
AMMONIA AND HYDRAZINE SALTS OF
THE $B_{10}H_{10}^{-2}$ ANION
Walter H. Knoth, Jr., Mendenhall, Pa., assignor to E. I. du Pont de Nemours and Company, Wilmington, Del., a corporation of Delaware
No Drawing. Filed Feb. 5, 1960, Ser. No. 6,853
6 Claims. (Cl. 23—14)

This invention relates to boron compounds. More particularly, it relates to novel boron hydride derivatives and to a method for their preparation.

Boron hydrides have recently become of interest in various applications. One such application for which they have been found especially useful is in the field of high energy fuels. The principal object of the present invention is therefore, to provide new boron hydride derivatives suitable as a high energy fuel and for other utilities. Another object is provision of a process for making the novel compounds.

In the furtherance of the above-mentioned and yet other objects, there are now provided compounds which are the ammonium and hydrazine salts of the boron hydride anion of the formula $B_{10}H_{10}^{--}$. These compounds have the formulas $(NH_4)_2B_{10}H_{10}$ and $(NH_2NH_3)_2B_{10}H_{10}$. These compounds are solids having a high heat of combustion and, because of this property, they are especially useful as high energy fuels. They are free of carbon and other elements of atomic number higher than 14, which elements, if present, would result in lower heats of combustion.

The boron hydride salts of this invention are prepared by reaction of 2 moles of ammonium hydroxide or hydrazine hydrate with 1 mole of the boron hydride acid, $H_2^{++}B_{10}H_{10}^{--}\cdot(H_2O)_3$ [or, as the hydronium compound, $[H_3O]_2^{++}B_{10}H_{10}^{--}\cdot H_2O$], in aqueous solution. The reaction is conveniently carried out by neutralizing ammonium hydroxide or hydrazine hydrate with an aqueous solution of the boron hydride acid at ordinary temperatures (20°–30° C.). The resulting neutral solution is evaporated to dryness to leave a solid crystalline residue of the salt. This salt can then be dried at ordinary or moderately elevated temperatures under reduced pressure.

The acid, $H_2^{++}B_{10}H_{10}^{--}\cdot(H_2O)_3$, used as starting material in the process of this invention can be prepared by treating an aqueous solution of an amine salt of a boron hydride having the formula $(R_{4-x}NH_x)_2B_{10}H_{10}$, wherein R is alkyl and $x$ is 1, 2 or 3, with a strongly acidic ion exchange resin capable of replacing cations, e.g., the ion exchange resin of the sulfonic acid type known commercially as "Amberlite" grade "IR–120," acid form (see U.S. Patent 2,901,398). The free acid is obtained from the aqueous solution by evaporation at moderately elevated temperatures, e.g., 40–50 ° C., at reduced pressure. This process is described in greater detail in application S.N. 6,855, filed February 5, 1960.

An alternative method for the preparation of the ammonium salt of the $B_{10}H_{10}^{--}$ anion comprises the reaction of liquid ammonia with a decaboryl bis(organic sulfide), preferably a decaboryl bis(dialkyl sulfide), at a temperature between about —50° C. and 0° C. Bis(lower dialkyl sulfides), i.e., those in which each alkyl group has up to 8 carbons, are especially useful as starting materials in this reaction. After the reaction between the ammonia and the decaboryl derivative is complete (about 1 hour being sufficient under these reaction conditions) the resulting solution of the ammonium salt of the $B_{10}H_{10}^{--}$ anion is isolated by allowing the excess ammonia to evaporate. The crude product is purified by subjecting it to a high vacuum (0.01 mm. of mercury) at a temperature of 25° C.

Another embodiment of the method for the preparation of the ammonium salt of the $B_{10}H_{10}^{--}$ anion comprises the reaction of ammonium hydroxide in aqueous or aqueous-alcoholic solution with a decaboryl bis(alkyl sulfide), preferably a decaboryl bis(alkyl sulfide) in which each alkyl group has up to eight carbon atoms. This embodiment can be carried out at temperatures ranging from room temperature (20–30° C.) up to 100° C., and preferably at a temperature between 60° and 85° C. The resulting ammonium salt is isolated from the reaction mixture by evaporation of the filtered reaction solution to dryness.

The decaboryl bis(dialkyl sulfide) used as starting material in this alternative process can be prepared by contacting a dialkyl sulfide with decaborane at a temperature between 0° C. and 150° C. until approximately 1 mole of hydrogen is evolved. The preparation of decaboryl bis(alkyl sulfides) is described in greater detail in U.S. application S.N. 750,862, filed July 25, 1958, by E. L. Muetterties.

The products of this invention are illustrated in further detail by the following examples:

*Example I*

PREPARATION OF $(NH_4)_2B_{10}H_{10}$

Decaboryl bis(dimethyl sulfide) (8.5 g., 3.5 millimoles) is mixed into 50 ml. of liquid ammonia and stirred in a round-bottomed reaction vessel for 1 hour with the vessel being cooled to a temperature of about —50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is a virtually quantitative yield of $(NH_4)_2B_{10}H_{10}$.

*Analysis.*—Calcd. for $B_{10}H_{18}N_2$: B, 70.0%; H, 11.7%; N, 18.2%. Found: B, 66.7%; H, 12.2%; N, 18.5%.

This salt is water soluble. Its aqueous solutions are highly conductive to an electric current. The high dissociation of this compound in water is also shown by its apparent molecular weight, as determined by freezing point lowering in water. The observed value is 64 compared to a true molecular weight of 154 and a theoretical molecular weight, assuming complete dissociation, of 51.3.

*Example II*

PREPARATION OF $(NH_2NH_3)_2B_{10}H_{10}$

Hydrazine hydrate is added to an aqueous solution of $H_2^{++}B_{10}H_{10}^{--}\cdot(H_2O)_3$ until the resulting clear solution is neutral. The reaction solution is evaporated and the resulting crystalline solid residue is then dried at 25° C. under a pressure of 1 mm. mercury for 4 hours.

*Analysis.*—Calcd. for $B_{10}H_{20}N_4$: B, 58.6%. Found: B, 56.87%.

This $(NH_2NH_3)_2B_{10}H_{10}$ burns extremely rapidly compared to amine salts of $B_{10}H_{10}$.

When the process of Example II is repeated with the single exception that the hydrazine hydrate is replaced by an equivalent quantity of ammonium hydroxide, the ammonium salt $(NH_4)_2B_{10}H_{10}$ is obtained.

*Example III*

ALTERNATE PREPARATION OF $(NH_4)_2B_{10}H_{10}$

Decaboryl bis(dimethyl sulfide) and a mixture of equal parts of concentrated aqueous ammonium hydroxide and methyl alcohol are heated on a steam bath for several minutes. The reaction mixture is then cooled and filtered and the filtrate is evaporated to dryness. The resulting solid is the ammonium salt of the formula $$(NH_4)_2B_{10}H_{10}$$

The identity of this salt is confirmed by its infrared absorption spectrum.

The salts of this invention are especially useful as high energy fuels, because of their high heats of combustion. The ammonium and hydrazine salts of $B_{10}H_{10}^{--}$ anion, being free of carbon, have a marked advantage over the substituted ammonium salts of $B_{10}H_{10}^{--}$ in their value as high energy fuels.

The salts of this invention are also useful as chemical intermediates.

Since obvious modifications and equivalents in the invention will be evident to those skilled in the chemical arts, I propose to be bound solely by the appended claims.

The embodiments of the invention in which an exclusive property or privilege is claimed are defined as follows:

1. The ammonium and hydrazine salts of the boron hydride anion $B_{10}H_{10}^{--}$, said salts being selected from the class consisting of $(NH_4)_2B_{10}H_{10}$ and $$(NH_2NH_3)_2B_{10}H_{10}$$

2. $(NH_4)_2B_{10}H_{10}$.
3. $(NH_2NH_3)_2B_{10}H_{10}$.
4. The process which comprises reacting a member of the group consisting of ammonium hydroxide and hydrazine hydrate with the boron hydride acid $$H_2^{++}B_{10}H_{10}^{--}\cdot(H_2O)_3$$

and isolating the resulting product.

5. The process which comprises reacting, at a temperature in the range $-50°$ to $0°$ C., ammonia with a decaboryl bis(lower alkyl sulfide), and isolating the resulting product.

6. Process for preparing $(NH_4)_2B_{10}H_{10}$ which comprises reacting at a temperature in the range of $20°$ to $100°$ C. ammonium hydroxide with a decaboryl bis(lower alkyl) sulfide and isolating the resulting $(NH_4)_2B_{10}H_{10}$.

References Cited in the file of this patent

Lipscomb: J. Am. Chem. Soc., vol. 81, No. 21, pp. 5833, 5834, Nov. 5, 1959.